Nov. 26, 1935.  E. E. WEMP  2,022,019
SERVO CLUTCH
Filed Dec. 22, 1933   2 Sheets-Sheet 1

INVENTOR.
ERNEST E. WEMP.
BY
Barnes, Kisselle & Laughlin
ATTORNEYS.

Nov. 26, 1935.   E. E. WEMP   2,022,019
SERVO CLUTCH
Filed Dec. 22, 1933   2 Sheets-Sheet 2

INVENTOR.
ERNEST E. WEMP.
BY
Barnes, Kisselle & Laughlin
ATTORNEYS.

Patented Nov. 26, 1935

2,022,019

UNITED STATES PATENT OFFICE 2,022,019

SERVO-CLUTCH

Ernest E. Wemp, Detroit, Mich.

Application December 22, 1933, Serial No. 703,572

13 Claims. (Cl. 192—36)

This invention relates to a servo-clutch and particularly to a clutch for use in an automotive vehicle. More particularly, the invention is directed to the provision of a clutch engaged by packing springs and arranged to be released by an operator, but in which the operator is not required to compress the packing springs for clutch disengagement but merely actuates certain control mechanism which brings into effect outside power, such as the torque of some of the parts for compressing the packing springs.

The object of the invention is to provide an improved clutch structure of the type mentioned.

Figure 1:
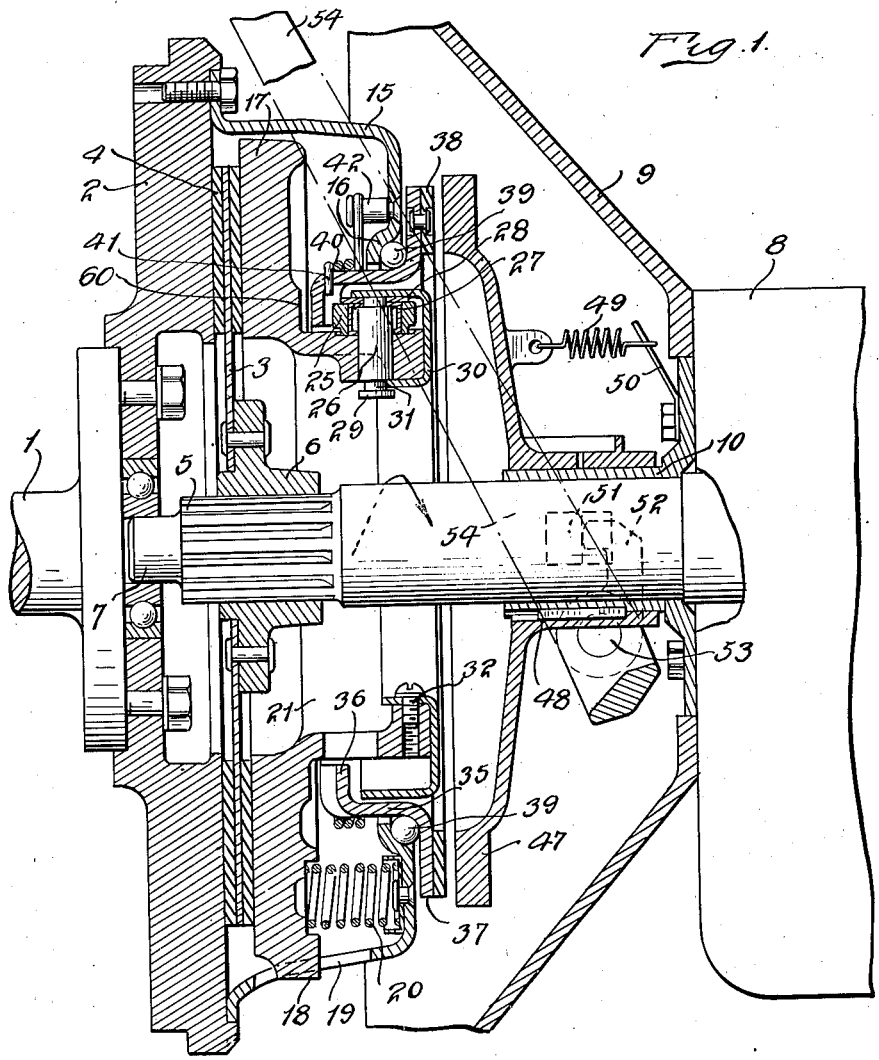
Fig. 1 is a cross sectional view of a clutch structure made in accordance with the invention showing the same in engaged position.

The crank shaft of an engine is illustrated at 1 attached to which is a flywheel 2 which may constitute a clutch driving member. A driven disc 3 which may have the usual clutch facings 4 is mounted upon a driven shaft 5 through the means of a hub 6, and the driven shaft may be piloted in the flywheel as at 7, and the same extends into a gear transmission housing 8 which may be connected to a clutch housing 9 on the engine. The transmission housing 8 may have a tubular extension 10 through which the shaft 5 extends and the purpose of which will presently appear.

The clutch may be provided with a cover plate 15 attached to the flywheel by cap screws or the like and which has a ball race 16 on its inner periphery edge which may be formed by suitably shaping the metal of the cover plate. The cover plate may be a sheet metal stamping and such material does not afford a hardened ball race but the clutch herein is so designed that the clutch cover itself may be used as a ball race as will later appear.

A pressure plate is shown at 17 which may be associated in driving relation with the cover plate by means of projections 18 slidably fitting in slots 19 in the cover plate. The pressure plate may be urged towards the driven disc by an annulus of coil springs 20 arranged between the pressure plate and cover plate. The pressure plate may have an axial extension 21 for the purpose of associating the pressure plate with controlling means.

The controlling means comprises an element or elements for exerting force on the pressure plate to retract it from the driven disc, thus compressing the packing springs. For this purpose the axially extending portion 21 may be provided with a number of devices to which the force is applied and which devices advantageously take the form of rollers 25. Each roller may be journaled on a pin 26 through the means of a small or needle-type roller bearing 27. The outer end of each pin 26 may be reduced in cross section and fitted in the aperture of a spacing washer 28. The inner end may be reduced in cross section and may be provided with a head 29. A ring which may be a sheet metal stamping U-shape in cross section, and as illustrated at 30, may be slipped into place; the ring has notched portions as at 31 for fitting over the reduced part and the body portion of each pin, while the other leg of the U lies over the outer end of each pin and the roller as shown. The ring may be held to the pressure plate by one or more screws 32.

Preferably there are three rollers. In making the assembly each pin 26 may be inserted from the interior of the extension 21 and its outer end passed into the roller and washer 28; then the ring 30 may be positioned by axial movement from the rear and it embraces each pin so it is prevented from displacement. As clearly shown in Fig. 1 each pin is held from axial movement.

The retracting or servo-device may advantageously take the form of a sheet metal stamping generally Z-shaped in cross section having an intermediate portion 35 and end portions 36 and 37. The intermediate portion may substantially parallel the axis and the end portions may be substantially perpendicular thereto. The outer portion 37 may be provided with suitable friction facing material as at 38. Anti-friction elements, such as balls 39, may be disposed between the race 16 on the cover plate and the angle between the parts 35 and 37 of the servo-device which forms another race. A torsion spring 40 has one end connected to the servo-device as shown at 41, and the other connected to the cover plate as by means of the stud 42.

Figure 4:
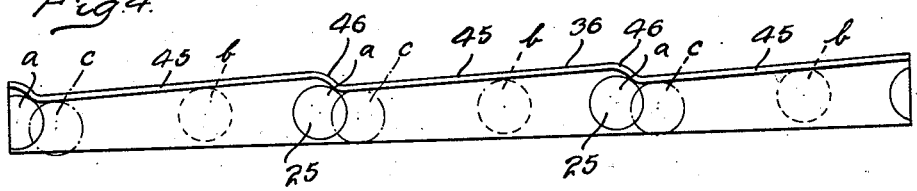
Fig. 4 is a diagrammatic developed view of a cam control element.

The portion 36 is provided with inclined planes or cam elements for cooperation with the rollers 25. This may be accomplished by a suitable shaping of the flange 36 as illustrated in Fig. 4. The developed view (Fig. 4) is reduced in size, and it illustrates how the flange 36 may be shaped to provide three inclined planes or cam elements 45 connected by relatively abrupt portions 46. Since it is advantageous to use a three point contact between the servo-device and the pressure plate, three rollers are provided and three cams are provided.

A control plate 47 has a hub portion slidably mounted upon the extension 10 but keyed thereto as at 48 so that it cannot rotate. It may be held retracted by a spring 49 fastened to the control plate and to a clip 50. The control plate may have abutments 51 on opposite sides, against which fork arms 52 abut, the fork arms being mounted upon a clutch control shaft 53, while a lever is illustrated at 54. This may be the usual clutch lever operated by the foot.

Figure 3:
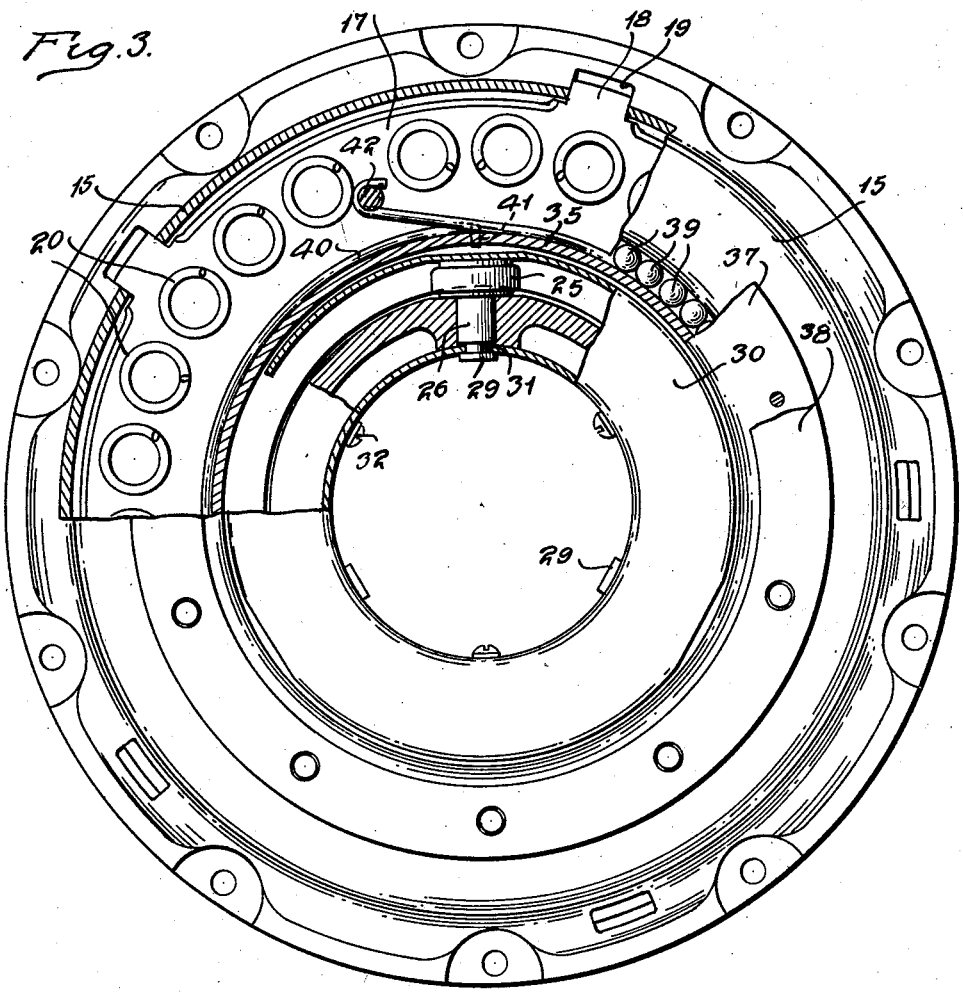
Fig. 3 is an end view partly in elevation and with parts cut away and with some parts shown in section.

The servo-ring is capable of a limited amount of rotation relative to the cover plate and pressure ring. The torsion spring 40 serves to properly position the servo-ring under normal driving conditions. The parts may rotate in the usual manner which may be counter-clockwise as Fig. 1 is viewed from the right and counter-clockwise as Fig. 3 is viewed. An advantageous arrangement is to have the torsion spring hold the servo ring in a position where the several rollers contact with the abrupt portions 46 as illustrated at positions a of Fig. 4, the rollers being shown in solid lines. As a result the servo-ring is cammed forwardly with a fairly light pressure thus holding the anti-friction balls tightly engaged between the cover plate and the servo-ring and, as well, holding the servo-ring and rollers in snug engagement to the end that there is no looseness.

Figure 2:
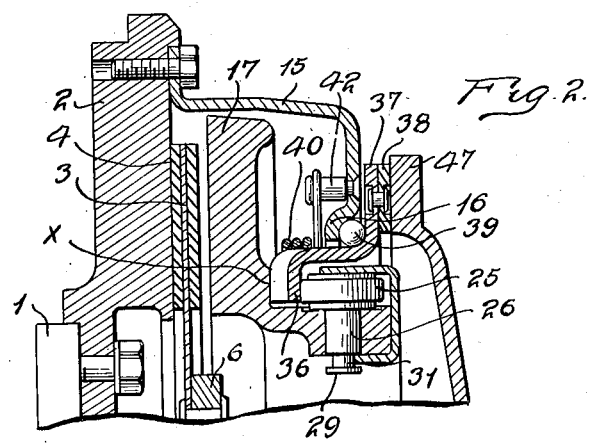
Fig. 2 is a partial sectional view showing the parts in released position.

To disengage the clutch an operator depresses the lever 54 to bring the control plate into frictional engagement with the facing 38 and thus decelerate the servo-ring. The rollers and servo-ring move relative to each other, and when the rollers come to position b as illustrated in dotted lines, they strike the cams 45 and upon continued movement the rollers ride up the cams to position c, thus shifting the pressure plate against the action of the springs 20 and releasing the clutch. When the clutch is disengaged the servo-ring again rotates uniformly with the driving members, and to accomplish this the relative rotational movement may be limited by a more or less central part 60 of the pressure ring making contact with the servo-ring as illustrated at x in Fig. 2. At this time, of course, there is friction between the facing 38 and the control plate 47 and the clutch is held disengaged so long as the operator maintains sufficient friction. To engage the clutch the operator merely releases the pedal slowly or quickly as desired to get a gradual or quick clutch engagement; this releases the servo-ring and the torsion spring returns it to its normal position. On the return movement the clutch becomes fully engaged when the rollers reach position b of Fig. 4, and then the servo-ring continues to move until the rollers and cams are in the relative positions as illustrated at a. The slight retracting force on the pressure ring in normal position is not sufficient to have any detrimental effect upon the clutch as the packing springs 20 are so much stronger than the torsion spring 40. In the reengagement of the clutch the forward motion of the pressure plate resulting in the rollers 25 acting upon the cams 45 from position a to position b may aid the torsion spring in returning the servo-ring.

Very little work is required of the operator; the lever 54 may be depressed with very light pressure which may be about the same as, or less than, the weight of the operator's foot, and by varying the amount of pressure the clutch action may be controlled with a nicety. The particular design herein affords a large diameter for the cam elements or inclined planes with the result that the cams may be relatively long and a large mechanical advantage may be obtained. Also, a bearing of large diameter is provided by the anti-friction elements between the cover plate and servo-ring and it is thought to be preferable to provide a large number of anti-friction elements or balls in this bearing. Due to the large diameter thus provided and the use of a large number of anti-friction elements it is feasible to have the ball races formed by suitably shaped portions of the cover plate and servo-ring. Another feature of the design is the rigidity and strength of the structure although the same may be parts made from sheet metal stampings. The reaction points are kept close together. That is to say, the point where the cams take the clutch releasing force is not far removed radially from the bearing 39. Moreover the reaction force on the race 16 of the cover plate is positioned relatively close to the point of attachment of the cover plate to the flywheel. Accordingly, there is very little distortion of these parts when overcoming the forces necessary to release the clutch although the same may be made of sheet metal stampings.

Moreover it will be observed that the clutch structure eliminates the usual clutch levers by means of which a mechanical advantage is obtained in releasing the clutch. As is well known to those versed in the clutch art a number of these levers extend radially from a point near the center of the clutch outwardly and they require a certain amount of space which in turn makes it necessary to reduce the number of packing springs. However, in the clutch herein disclosed the space for the packing springs is not interfered with and as a result a large number of springs may be used, and each spring accordingly may be of less strength than each spring in an assembly where fewer springs are used, yet obtaining a clutch of requisite torque capacity.

I claim:

1. A clutch comprising in combination, a driving member, another driving member in the form of an axially shiftable pressure plate and having a driving connection with the first driving member, a driven member arranged to be packed between the driving members when the clutch is engaged, an annulus of packing springs acting directly upon the pressure plate to engage the clutch, a servo-device normally rotating in unison with the pressure plate and having a positively limited rotational movement relative to the pressure plate and held in a fixed axial position, inclined planes on the servo-device, means on the pressure plate for direct cooperation with the inclined planes, and operator controlled means for causing such relative rotational movement of the servo-device whereby the inclined planes act directly upon the pressure plate to shift the same axially against the action of the springs to disengage the clutch.

2. A clutch comprising, driving and driven members arranged to be packed together in driving relation and including an axially shiftable pressure plate, a clutch cover plate, a servo-device associated with the cover plate and normally rotating in unison therewith and having a limited rotational movement relative thereto, anti-friction bearing elements between the cover plate and the servo-device, inclined planes on the servo-device, abutment means on the pressure plate for direct operation on the inclined planes, and operator controlled friction means for decelerating the servo-device to cause such limited relative rotational movement of the servo-device.

3. A clutch comprising in combination, driving and driven members arranged to be packed together in driving relation and including an axially shiftable pressure plate, a clutch cover plate, said plate being formed with a bearing race, a servo-device associated with the cover plate and also formed with a bearing race, anti-friction elements between the two races, said servo-device being arranged to normally rotate in unison with the cover plate but capable of limited rotational movement relative thereto, inclined planes on the servo-device, abutment means on the pressure plate for cooperation with the inclined planes, and operator controlled means for applying friction to the servo-device to cause such limited relative rotational movement of the servo-device.

4. A clutch comprising in combination, driving and driven members arranged to be packed together in driving relation and including an axially shiftable pressure plate, a clutch cover plate comprising a sheet metal stamping formed with a bearing race directly therein, a servo-device of sheet metal stamping associated with the cover plate and having a bearing race directly therein, a plurality of closely spaced anti-friction balls between the races, said servo-device normally rotating in unison with the cover plate but capable of limited rotational movement relative thereto, inclined planes on the servo-device, means by which the inclined planes are effective upon the pressure plate, and operator controlled means for causing such limited relative rotational movement of the servo-device.

5. A clutch comprising, a driving member, another driving member in the form of an axially shiftable pressure plate, a driven member and a driven shaft therefor, a clutch cover plate fastened to the first driving member and extending axially over the pressure plate and having a radially inwardly extending part, an annulus of clutch packing springs between the inwardly extending part of the cover plate and the pressure plate, the inwardly extending part of the cover plate having a central aperture therein of relatively great diameter as compared to the driven shaft, and the peripheral portion of the cover plate around the aperture being formed into a bearing race, the pressure plate having an axial extension in said aperture of the cover plate, abutment means on said extension, a servo-device having an axially extending portion extending through the aperture and telescoping over the said extension and having a bearing race, anti-friction elements between the said two bearing races, the inner portion of the servo-device having a radially inwardly extending part overlapping the said abutments and provided with inclined planes, spring means interconnecting the cover plate and servo-device holding the servo-device to normally rotate in unison with the cover plate, said servo-device having limited rotational movement relative to the cover plate, and operator controlled means for applying friction to the servo-device to decelerate it and cause such limited relative rotational movement thereof, whereby the inclined planes act upon the said abutments to shift the pressure plate axially and release the clutch.

6. A clutch comprising a driving member, another driving member in the form of an axially shiftable pressure plate, a driven member and a driven shaft therefor, a clutch cover plate fastened to the first driving member and extending axially over the pressure plate and having a radially inwardly extending part, an annulus of clutch packing springs between the inwardly extending part of the cover plate and the pressure plate, the inwardly extending part of the cover plate having a central aperture therein of relatively great diameter as compared to the driven shaft, and the peripheral portion of the cover plate around the aperture having a bearing race, the pressure plate having an axial extension in said aperture of the cover plate, abutment means on said extension, a servo-device having an axially extending portion extending through the aperture and telescoping over the said extension and having a bearing race, anti-friction elements between the said two bearing races, the inner portion of the servo-device having a radially inwardly extending part overlapping the said abutments and provided with inclined planes, spring means interconnecting the cover plate and servo-device holding the servo-device to normally rotate in unison with the cover plate, said servo-device having limited rotational movement relative to the cover plate, and operator controlled means for applying friction to the servo-device to decelerate same to cause such limited relative rotational movement thereof, whereby the inclined planes act upon the said abutments to shift the pressure plate axially and release the clutch.

7. A clutch comprising a driving member, another driving member in the form of an axially shiftable pressure plate, a driven member and a driven shaft therefor, a clutch cover plate fastened to the first driving member and extending axially over the pressure plate and having a radially inwardly extending part, an annulus of clutch packing springs between the inwardly extending part of the cover plate and the pressure plate, the inwardly extending part of the cover plate having a central aperture therein of relatively great diameter as compared to the driven shaft, and the peripheral portion of the cover plate around the aperture having a bearing race, the pressure plate having an axial extension in said aperture of the cover plate, abutment means on said extension, a servo-device having an axially extending portion extending through the aperture and telescoping over the said extension and having a bearing race, anti-friction elements between the said two bearing races, the inner portion of the servo-device having a radially inwardly extending part overlapping the said abutments and provided with inclined planes, spring means interconnecting the cover plate and servo-device holding the servo-device to normally rotate in unison with the cover plate, said servo-device having limited rotational movement relative to the cover plate, the outer portion of the servo-device extending in a radial direction, a non-rotatable control plate, and means for shifting the plate into frictional engagement with the last mentioned portion of the servo-device to decelerate the same and cause such limited rotational movement thereof whereby the inclined planes act upon said abutments to release the clutch.

8. In a servo-clutch, a clutch cover plate having an aperture therein, a clutch pressure plate formed with abutments, a substantially Z-shaped servo-device journaled in the aperture of the cover plate, the inner portion of which has inclined planes for cooperation with the abutments, spring means interconnecting the cover plate and servo-device so that the servo-device is held normally rotatable in unison with the cover plate, said servo-device having limited rotational movement relative to the cover plate against the action of said spring, and a non-rotatable operator actuated control plate movable into frictional engagement with the outer portion of the servo-device to decelerate the same and cause such limited relatively rotational movement against the action of said spring whereby the inclined planes act upon the abutments and shift the pressure plate to release the clutch, said spring returning the servo-device to its initial position when the same is released by the control plate.

9. In a servo-clutch, a clutch cover plate having a central aperture therein, a pressure plate having an extension concentric with the aperture, abutment means on the extension, a servo-ring journaled in the aperture and substantially Z-shape in cross section, cam surfaces on the inner leg of the Z cooperating with the abutments, spring means connecting the cover plate and servo-ring, said servo-ring normally rotating with the cover plate, an operator controlled friction means arranged to be brought in frictional engagement with the outer leg of the Z to cause the servo-ring to decelerate relative to the cover plate whereby the cam surfaces act upon the abutments and shift the pressure plate, and means for limiting the decelerating movement of the servo-ring.

10. In a servo-clutch, an axially shiftable pressure ring, a cover plate having an aperture, clutch packing springs between the cover plate and pressure ring, a servo-device positioned in the aperture and having cam surfaces, means on the pressure ring for engagement with the cam surfaces, means connecting the cover plate and servo-device so that the servo-device normally rotates in unison with the cover plate, operator controlled means for decelerating the servo-device relative to the cover plate whereby the cams act upon the pressure ring to shift the same against the action of the packing springs, means for limiting the decelerating movement of the servo-device, bearing means between the cover plate and the servo-device for taking the reactive force of the packing springs, said bearing means and the cam surfaces being located within the inner and outer peripheries of the pressure ring.

11. In a servo-clutch, a driving member, a clutch cover plate fastened thereto, a clutch pressure plate having abutments thereon, a servo-device arranged to normally rotate in unison with the cover plate and having cam surfaces for acting upon the said abutments, packing springs between the cover plate and the pressure plate, operator controlled means for shifting the servo-device rotationally relative to the cover plate whereby the cam elements act upon the said abutments and shift the pressure plate, bearing means between the servo-device and the cover plate for taking the reactive force of the packing springs, said bearing means being located relatively close to the point of attachment of the cover plate to the driving member to minimize distortion of the pressure plate, and said bearing means and the place of contact between the cams and abutments being positioned relatively close to each other to minimize distortion in the servo-device.

12. In a servo-clutch, a pressure plate having abutments thereon, a cover plate, a servo-device, said servo-device having circumferentially arranged cam elements one for operating on each abutment with said cam elements connected by relatively abrupt parts, packing springs between the cover plate and pressure plate, said servo-device journaled on the cover plate for limited rotation relative thereto, spring means interconnecting the cover plate and servo-device normally holding the servo-device in a position where the abrupt parts contact with the abutments and hold the servo-device and cover plate tightly together by the reaction of the packing springs, and operator controlled means for causing the servo-device to move rotationally relative to the cover plate whereby the cam elements act upon the abutments to shift the pressure plate, said spring which interconnects the servo-device and cover plate serving to return the servo-device to a position where the abrupt parts again contact with the abutments upon release of the servo-device of the operator controlled means.

13. A servo-clutch comprising, a flywheel, a cover plate secured thereto, a pressure plate, an annulus of coil springs between the cover plate and pressure plate, a driven disc between the flywheel and pressure plate and packed between these two members by said springs, interengaging means between the pressure plate and the cover plate, establishing a driving connection therebetween and arranged to permit the pressure plate to shift axially with respect to the cover plate, said cover plate having a central aperture therein inside the annulus of springs, the pressure plate having parts extending axially through said aperture, a servo-device journaled in the aperture of the cover plate and having inclined planes, abutments on said parts of the pressure plate for cooperation with said inclined planes, spring means interconnecting the servo-device and cover plate whereby they normally rotate in unison, and control means for applying friction to the servo-device to decelerate the same and effect relative movement between the servo-device and cover plate whereby the inclined planes act upon the abutments to retract the pressure plate axially against the action of the springs to disengage the clutch.

ERNEST E. WEMP.